(12) United States Patent
Masukawa

(10) Patent No.: US 6,325,024 B1
(45) Date of Patent: Dec. 4, 2001

(54) COLLAR FOR PET

(76) Inventor: Chihiro Masukawa, 802, 51-13, Eifuku, 3-chome, Suginami-ku, Tokyo (JP)

( * ) Notice: Subject to any disclaimer, the term of this patent is extended or adjusted under 35 U.S.C. 154(b) by 0 days.

(21) Appl. No.: 09/366,904

(22) Filed: Aug. 4, 1999

(30) Foreign Application Priority Data

Oct. 26, 1998 (JP) .................................................. 10-008880
May 14, 1999 (JP) .................................................. 11-134245

(51) Int. Cl.[7] .................................................. A62B 35/00
(52) U.S. Cl. ........................... 119/858; 119/856; D30/152
(58) Field of Search ..................... 119/856, 858, 119/863; 2/151, 154; D30/152

(56) References Cited

U.S. PATENT DOCUMENTS

| D. 206,525 | * | 12/1966 | Klimkiewicz ........................ D30/152 |
| D. 206,526 | * | 12/1966 | Klimkiewicz ........................ D30/152 |
| D. 206,749 | * | 1/1967 | KlimKiewicz ........................ D30/152 |
| D. 206,861 | * | 2/1967 | Klimkiewicz ........................ D30/152 |
| 623,378 | * | 4/1899 | McKee ..................................... 2/152 |
| 5,363,809 | * | 11/1994 | Roe ....................................... 119/792 |
| 5,467,743 | * | 11/1995 | Doose ................................... 119/864 |
| 5,794,572 | * | 8/1998 | Saunders et al. .................... 119/858 |
| 6,016,772 | * | 1/2000 | Noyes ................................... 119/863 |

* cited by examiner

*Primary Examiner*—Michael J. Carone
*Assistant Examiner*—Judith A. Nelson
(74) *Attorney, Agent, or Firm*—Reed Smith LLP

(57) ABSTRACT

A collar for a pet comprises a band to be wound around the neck of a pet and a primary decoration that imitates part of a piece of clothing worn by a person. The decoration has an upper edge extending as an arcuate ascending curve from the rear of the neck of the pet to the front when the collar is put around the neck of the pet. An element, which partially overlaps with the primary decoration allows a detachable added decoration to be attached to the band. This attachment element is not seen from outside. The band is prevented from turning by any one of various mechanism.

11 Claims, 22 Drawing Sheets

THE NECK OF A PET

THE NECK OF A PET

THE STATE VIEWED FROM THE TOP

THE STATE VIEWED FROM THE SIDE

COLLAR FOR PET

BACKGROUND OF THE INVENTION

Field of the Invention

The present invention relates to a collar for a pet having decoration means.

The conventional collars to be put on pets have been made to meet the practical needs of preventing a pet from running away or fixing a chain or a leash to take a pet out for a walk. Thus, for the conventional collars for pets, their material and fixing technique are regarded as particularly important.

However, collars for pets having an added value have recently been developed. For example, Japanese Utility Model Registration No. 3046174 discloses a collar serving as an accessory for removing static electricity (hereinafter referred to as "conventional collar"). This conventional collar is designed to be hung down from the neck of a pet in order to discharge static charges stored in the pet into the air. The conventional collar is an independent collar to be put on a pet, in addition to a collar for fixing a leash.

Japanese Utility Model Registration No. 3054022 discloses clothing for a pet called "a fuzzy dress for a pet" (hereinafter referred to "conventional clothing"). The conventional clothing includes a long bib attached to a member to be hung down from the neck of a pet. The conventional clothing is designed so that a pet can wear it until an incision after surgery is healed.

Further, Japanese Utility Model Application Laid-open No. Sho 57-080261 discloses a collar with trimmings made of fabric (hereinafter referred to as "first conventional decorated collar"). The first conventional decorated collar is an ordinary collar for a pet with trimmings made of fabric and when put on a pet, the first conventional decorated collar makes the pet look cute. Still further, Japanese Utility Model Application Laid-open No. Sho 64-020178 discloses a collar having a decorating fabric attached to its surface through a Hook-and-Loop fastener (hereinafter referred to as "second conventional decorated collar).

However, the aforementioned conventional collar, conventional clothing and first and second conventional decorated collars (hereinafter collectively referred to as "conventional collars for pets) have had the following problems. First, the conventional collar only serves as a pendant to be put on a pet other than its function of discharging static electricity, and hence the collar is not provided with no personifying decoration. Therefore, with the conventional collar, it would be hard for a family to foster such an affection as to treat the pet as an equal partner. Particularly, when all the members of a family celebrate a special occasion and when they wish to enjoy the occasion together with their pet while treating their pet as a member of the family, the conventional collar is not suitable.

Further, the conventional clothing is shaped like a long bib for a pet, and is designed to be worn by the pet with the main purpose of protecting an incision after surgery until the incision is healed. Therefore, the conventional clothing serves only as a long bib that can stay in its regular position. Further, the portion wrapped around the neck of the pet in the conventional clothing has the same shape as that of an ordinary collar, and hence has no personifying decoration. As a result, the conventional clothing is not suitable to make a family think that their pet is a member of the family.

Further, the first conventional decorated collar is useful in making a pet look cute, but is not good enough in terms of personifying decoration. As a result, the first conventional decorated collar does not give a family a sense of unity with their pet. Still further, the second conventional decorated collar is constructed so that the decorating fabric is detachably attached to the collar with a fastener, but the collar has no personifying decoration. Therefore, the second conventional decorated collar does not satisfy a person loving his or her pet more than his or her family in the sense that the collar does not make his or her pet look more lovely.

Further, the conventional collars for pets have the following problem unresolved. The conventional collars for pets lack personifying decoration in the true sense of the meaning, because they use as the base a conventional type collar whose shape is simply circular. A difference between the structure around the neck of a person and that of a pet could explain the reason why the conventional collars for pets lack personifying decoration. As shown in FIGS. 26(A) and 26(B), the angle a formed between the neck and the shoulder of a person 81 is substantially right angles to each other. As a result, when a substantially straight neckband 83 is looped, the neckband 83 fits the neck of the person.

For the person 81, the neck of, e.g., a shirt is too narrow when a spread collar 82 exactly overlaps with the neckband 83. Thus, a clearance is provided between the spread collar 82 and the neckband 83 so that a predetermined angle is formed between the spread collar 82 and the neckband 83 as will be described later. That is, as shown in FIG. 26 (C), the radius of curvature of an arc XY on an upper edge 82b of the spared collar 82 for the person 81 is made larger then the radius of curvature of an arc PQ of an upper edge 83b as viewed from the top of the neckband 83 when the neckband 83 is looped, and is made smaller than the radius of curvature of an arc ST of the upper edge 83b as viewed from the side of the neckband 83.

In contrast thereto, FIGS. 27(A) and 27(B) show a case where a four-footed animal (a dog 90 in this case) is wearing a collar, which is part of a piece of clothing for a person. As shown in FIGS. 27(A) and 27(B), the dog 90, gradually growing thick along its trunk from its neck, does not have, unlike the person 81, the chest and the shoulder sufficiently developed for supporting the spread collar 82. As a result, the angle β formed between the neck and the trunk of the dog 90 is extremely large compared with the corresponding angle a for the person. Therefore, as shown in FIG. 27(A), when the collar portion of a shift to be worn by the person 81 is simply put on the dog 90, the dog cannot be personified sufficiently, and hence looks unnatural.

That is, as shown in FIG. 27(B), the width direction 83c of the neckband 83 extends substantially perpendicularly, and hence does not fit the angle β formed between the neck and the trunk of the dog 90. As a result, as shown in FIG. 27(A) in an enlarged form, a clearance P (shaded part) is provided between the neck of the dog 90 and the upper edge of the collar. Further, the angle γ formed between the spread collar 82 and the neckband 83 causes the spread collar 82 to float from the neck of the dog 90, thereby making the collar for a pet unnatural due to a funny spread collar attached thereto.

Further, as will be described later, the collar can be fastened tightly so that the clearance should not be provided between the neck and the upper edge of the collar. However, if the collar has a decoration such as a spread collar, it cannot be fastened tightly unlike an ordinary collar. A collar having accessories comes in contact with the neck of a pet in large areas. As a result, when such a collar is fastened tightly, the pet feels uneasy and tries to take the collar off. Therefore, to prevent this from happening, a decorated collar for a pet must be designed so that it is naturally fit and felt comfortable.

When the collar is not fastened tightly, there arises another problem. When a collar with a decoration has been put on a pet, the collar stays at its regular position, but while the pet is moving around, the collar is turned. As a result, the decorative portion such as a spread collar moves from its regular position, which is the front, to the rear of the neck of the pet, thereby spoiling the decoration.

Further, as shown in FIG. 28, a conventional collar such as the first conventional decorated collar 85 is put on the dog 90 in such a manner that a large angle θ2 is formed relative to the horizontal direction, because the neck of the dog 90 does not stand upright. The angle 2 is extremely large compared with the angle θ1 (see FIG. 26(A)) formed by the upper edge of the spread collar 82 relative to the horizontal direction when the spread collar 82 is put on the person 81. When put at such a large angle as θ2, the collar 85, even provided with its decoration, does not allow anybody to clearly see the decoration from the front. In addition, an atmosphere different from the spread collar 82 for the person 81 is produced, and hence the pet is not sufficiently personified even if a decorating fabric 86 is replaced with the spread collar 82.

Still further, let us think about a case where added decorations are detachably attached to the collar for a pet for different occasions. In this case, if a part of a portion provided for attachment is seen from outside when an added decoration is taken out, the collar for a pet does not look cute when the added decoration is not attached thereto, thereby producing a sense of incompleteness.

SUMMARY OF THE INVENTION

Therefore, a first object of the present invention is to provide a collar for a pet that allows a family to think that their pet is an equal partner or a friend who is more beloved than a family member by personifying the pet while providing the collar with some decoration. A second object of the present invention is to provide a collar for a pet, beyond that it simply has personifying decoration means, which is worn comfortably by the pet, looks cute to the eyes of people, and makes the pet more personified. A third object of the present invention is to provide a collar for a pet that allows personifying decoration means to be held at a regular position. Further, a fourth object of the present invention is to provide a collar for a pet that increases the ties between a family and their pet by changing the atmosphere and appearance of the pet in accordance with various occasions, and that makes the pet look cute enough even when the collar is put on the pet on no special occasions.

To attain the objects described above, according to a first aspect of the present invention, there is provided a collar for a pet comprising: a band to be wound around the neck of a pet; and personifying decoration means for personifying the pet wearing the collar for a pet by imitating part of a piece of clothing to be worn by a person. Thus, the collar of the present invention excels in personifying decoration, so that a family will treat their pet wearing this collar as a member of the family.

According to a second aspect of the present invention, in the collar for a pet of the first aspect of the invention, the personifying decoration means is a member shaped like a spread collar. Thus, the collar can provide the personifying decoration of a pet which is suitable for various occasions.

According to a third aspect of the present invention, in the collar for a pet of the first aspect of the invention, the personifying decoration means is a member shaped like a spread collar undetachably attached to the band. With this arrangement, a pet wearing the collar is fully personified. Besides, this personification is completed by simply attaching the spread collar member that is quite small, which makes it possible to have a pet wear the collar for hours without the pet feeling uncomfortable.

According to a fourth aspect of the present invention, in the collar for a pet of the first aspect of the invention, the personifying decoration means is constructed so as to have an upper edge extending in the form of an arcuate ascending curve from the rear to the front of the neck of the pet when the collar for a pet is put around the neck of the pet. The collar for a pet is thus comfortable to wear for a pet, looks cute to the eyes of people and does not appear unnatural.

According to a fifth aspect of the present invention, in the collar for a pet of the first aspect of the invention, the personifying decoration means comprises a member shaped like a spread collar, and a curved shape of a joint portion of the spread collar is made the same as a curved shape of a joint portion of the band. Thus, the spread collar and the band almost entirely overlap with each other, so that the collar does not look unnatural when worn by a pet.

According to a sixth aspect of the present invention, in the collar for a pet of the first aspect of the invention, the personifying decoration member has a bib to be worn so as to extend from the neck to the belly of the pet. With this structure, not only the neck but also the trunk of the pet is decorated to be personified.

According to a seventh aspect of the present invention, in the collar for a pet of the first aspect of the invention, the band has a central angle varying from 45 to 145 degrees when developed, is joined with the upper edge of the personifying decoration means along the curve of the upper edge of the band, and is comprised of two band portions thereof joined together in the front. Simply fixing along the band the personifying decoration means, this collar looks natural and is comfortable for a pet. Also, such an arcuate band may be efficiently produced.

According to an eighth aspect of the present invention, in the collar for a pet of the first aspect of the invention, the band and the personifying decoration means are made of a fabric or an artificial leather. The collar therefore may be readily washed.

According to a ninth aspect of the present invention, there is provided a collar for a pet comprising: a band to be wound around the neck of a pet; personifying decoration means for personifying the pet wearing the collar for a pet by imitating part of a piece of clothing to be worn by a person; and an added decoration detachably attachable to the band or the personifying decoration means. Therefore, various added decorations may be attached replacing with one another to fit occasions.

According to a tenth aspect of the present invention, in the collar for a pet of the ninth aspect of the invention, a portion for attachment, which partially overlaps with the personifying decoration means and which allows the added decoration to be detachably attached to the band or the personifying decoration means, is provided in such a manner as not to be seen from outside. With this arrangement, the decoration of the collar may be changed to fit diverse occasions, and the collar can make the pet look cute enough even when the collar is put on the pet on no special occasions.

According to an eleventh aspect of the present invention, in the collar for a pet of the ninth aspect of the invention, the personifying decoration means is a member shaped like a spread collar. Thus, the collar can provide the personifying decoration of a pet which is suitable for various occasions.

According to a twelfth aspect of the present invention, in the collar for a pet of the ninth aspect of the invention, the personifying decoration means is a member shaped like a spread collar undetachably attached to the band. With this arrangement, a pet wearing the collar is fully personified. Besides, this personification is completed by simply attaching the spread collar member that is quite small, which makes it possible to have a pet wear the collar for hours without the pet feeling uncomfortable.

According to a thirteenth aspect of the present invention, in the collar for a pet of the ninth aspect of the invention, the personifying decoration means is constructed so as to have an upper edge extending in the form of an arcuate ascending curve from the rear to the front of the neck of the pet when the collar for a pet is put around the neck of the pet. The collar for a pet is thus comfortable to wear for a pet, looks cute to the eyes of people and does not appear unnatural.

According to a fourteenth aspect of the present invention, in the collar for a pet of the ninth aspect of the invention, the personifying decoration means comprises a member shaped like a spread collar, and a curved shape of a joint portion of the spread collar is made the same as a curved shape of a joint portion of the band. Thus, the spread collar and the band almost entirely overlap with each other, so that the collar does not look unnatural when worn by a pet.

According to a fifteenth aspect of the present invention, in the collar for a pet of the ninth aspect of the invention, the personifying decoration member has a bib to be worn so as to extend from the neck to the belly of the pet. With this structure, not only the neck but also the trunk of the pet is decorated to be personified.

According to a sixteenth aspect of the present invention, in the collar for a pet of the ninth aspect of the invention, the band has a central angle varying from 45 to 145 degrees when developed, is joined with the upper edge of the personifying decoration means along the curve of the upper edge of the band, and is comprised of two band portions thereof joined together in the front. Simply fixing along the band the personifying decoration means, this collar looks natural and is comfortable for a pet. Also, such an arcuate band may be efficiently produced.

According to a seventeenth aspect of the present invention, in the collar for a pet of the ninth aspect of the invention, the band and the personifying decoration means are made of a fabric or an artificial leather. The collar therefore may be readily washed.

According to an eighteenth aspect of the present invention, there is provided a collar for a pet comprising: a band to be wound around the neck of a pet; personifying decoration means for personifying the pet wearing the collar for a pet by imitating part of a piece of clothing to be worn by a person; and turn preventing means for preventing the band from turning. With this arrangement, the collar may be held at an original position even when a pet wearing the collar moves around.

According to a nineteenth aspect of the present invention, in the collar for a pet of the eighteenth aspect of the invention, the turn preventing means is provided at a predetermined position in the front of the pet, and has a weight ⅕ to 3 times a weight of the personifying decoration means. This causes the front of the collar to be pulled downward so that the collar is hard to be turned.

According to a twentieth aspect of the present invention, in the collar for a pet of the eighteenth aspect of the invention, the turn preventing means is a buckle arranged at a fastening portion of the collar for a pet and has a curved shape curved along the neck of the pet. With this arrangement, the collar is hard to be turned even without a heavy weight decoration attached to the front.

According to a twenty-first aspect of the present invention, in the collar for a pet of the eighteenth aspect of the invention, the turn preventing means is an added decoration detachably attachable to the band or the personifying decoration means. The collar therefore does not need to be provided with turn preventing means separately from the added decoration, avoiding the necessity of a number of members to be attached to its front, and hence is simple.

According to a twenty-second aspect of the present invention, in the collar for a pet of the eighteenth aspect of the invention, the personifying decoration means is a member shaped like a spread collar. Thus, the collar can provide the personifying decoration of a pet which is suitable for various occasions.

According to a twenty-third aspect of the present invention, in the collar for a pet of the eighteenth aspect of the invention, the personifying decoration means is a member shaped like a spread collar undetachably attached to the band. With this arrangement, a pet wearing the collar is fully personified. Besides, this personification is completed by simply attaching the spread collar member that is quite small, which makes it possible to have a pet wear the collar for hours without the pet feeling uncomfortable.

According to a twenty-fourth aspect of the present invention, in the collar for a pet of the eighteenth aspect of the invention, the personifying decoration means is constructed so as to have an upper edge extending in the form of an arcuate ascending curve from the rear to the front of the neck of the pet when the collar for a pet is put around the neck of the pet. The collar for a pet is thus comfortable to wear for a pet, looks cute to the eyes of people and does not appear unnatural.

According to a twenty-fifth aspect of the present invention, in the collar for a pet of the eighteenth aspect of the invention, the personifying decoration means comprises a member shaped like a spread collar, and a curved shape of a joint portion of the spread collar is made the same as a curved shape of a joint portion of the band. Thus, the spread collar and the band almost entirely overlap with each other, so that the collar does not look unnatural when worn by a pet.

According to a twenty-sixth aspect of the present invention, in the collar for a pet of the eighteenth aspect of the invention, the personifying decoration member has a bib to be worn so as to extend from the neck to the belly of the pet. With this structure, not only the neck but also the trunk of the pet is decorated to be personified.

According to a twenty-seventh aspect of the present invention, in the collar for a pet of the eighteenth aspect of the invention, the band has a central angle varying from 45 to 145 degrees when developed, is joined with the upper edge of the personifying decoration means along the curve of the upper edge of the band, and is comprised of two band portions thereof joined together in the front. Simply fixing along the band the personifying decoration means, this collar looks natural and is comfortable for a pet. Also, such an arcuate band may be efficiently produced.

According to a twenty-eighth aspect of the present invention, in the collar for a pet of the eighteenth aspect of the invention, the band and the personifying decoration means are made of a fabric or an artificial leather. The collar therefore may be readily washed.

BRIEF DESCRIPTION OF THE DRAWINGS

FIGS. 17(A) and 17(B) are diagrams showing the shape of the buckle attached to the band of the collar for a pet of FIG. 10 compared with the shape of a buckle attached to the band of the collar for a pet according to the first embodiment, in which FIG. 17(A) shows the collar for a pet according to the first embodiment and FIG. 17(B) shows the collar for a pet according to the second embodiment;

FIGS. 21(A) to 21(C) are diagrams showing a collar for a pet according to a fourth embodiment of the present invention, the collar for a pet having a bib long enough to extend from the neck to the belly of a pet via the chest, in which FIG. 21(A) is a view as viewed from the front, FIG. 21(B) from the rear, and FIG. 21(C) from the side;

FIGS. 22(A) to 22(C) are diagrams showing a pet wearing the collar for a pet of FIG. 21, in which FIG. 22(A) is a view as viewed from the front, FIG. 22(B) from the side; and FIG. 22(C) from the rear;

FIGS. 26(A) to 26(C) are diagrams showing the collar portion of a shirt to be worn by a person, in which FIG. 26(A) is a view as viewed from the side of the head, FIG. 26(B) from the front, and FIG. 26(C) is a view of the collar and the neckband as viewed from the top and the side;

FIGS. 27(A) and 27(B) are diagrams showing the collar portion for a person shown in FIGS. 26(A) to 26(C) which is put on a pet (dog), in which FIG. 27(A) is a view as viewed from the front, and FIG. 27(B) is a view of only the collar portion in the state of 27(A)

DETAILED DESCRIPTION OF THE PREFERRED EMBODIMENTS

Figure 1:
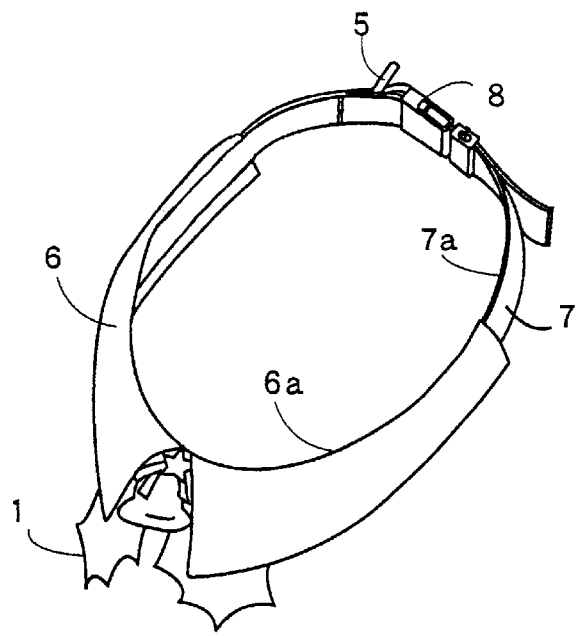
FIG. 1 is a perspective view showing a collar for a pet according to a first embodiment of the present invention.
Figure 2:
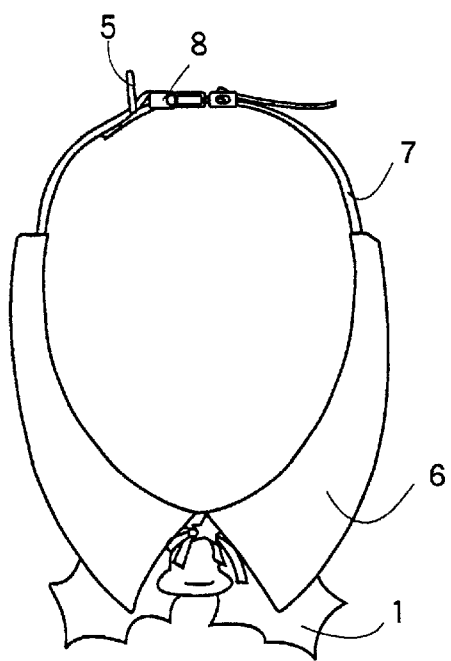
FIG. 2 is a diagram showing the collar for a pet of FIG. 1 as viewed from the head of the pet.
Figure 3:
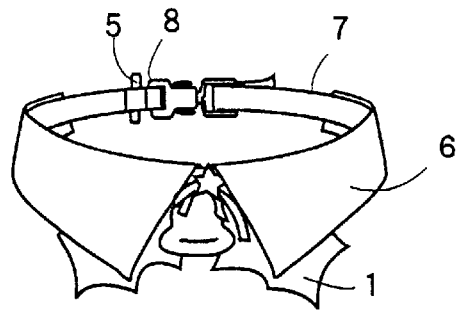
FIG. 3 is a diagram showing the collar for a pet of FIG. 1 as viewed from the front of the pet.
Figure 4:
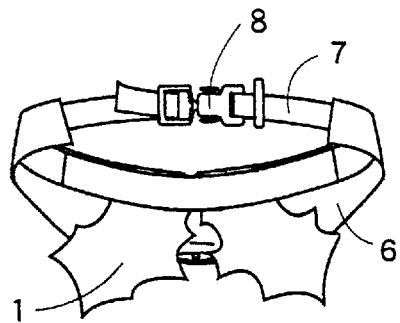
FIG. 4 is a diagram showing the collar for a pet of FIG. 1 as viewed from the rear of the pet.

Embodiments of the present invention will now be described with reference to FIGS. 1 to 25.

First, a collar for a pet according to a first embodiment will be described with reference to FIGS. 1 to 9.

As shown in FIGS. 1 to 4, a collar for a pet according to the first embodiment has a spread collar 6 and also a Christmas decoration 1 attached to a band 7. The collar 6 serves as a personifying decoration means and the decoration 1 as an added decoration. An upper edge 6a of the spread collar 6 is sewed onto the band 7 along an upper edge 7a of the band 7.

The Christmas decoration is detachably attached to the band 7 in such a manner that part of it is hidden behind the spread collar 6. A buckle 8 for freely adjusting the length of the band 7 is attached to the rear side of the band 7. A D-shaped fitting 5 is attached to an end of the buckle 8. As a result of this construction, the collar can be adjustably fitted around the neck of a pet.

Figure 5:
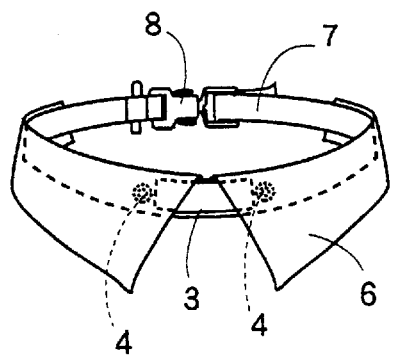
FIG. 5 is a diagram showing the collar for a pet of FIG. 3 with an added decoration removed therefrom.

Further, as shown in FIG. 5, a piece of Velcro 3 (e.g., a loop tape) and buttons 4, which serve as portions for attachment, are provided on the front side of the band 7. The piece of Velcro 3 is arranged at such a position as to allow both ends thereof to be hidden behind the spread collar 6. Further, the buttons 4 are arranged at such positions as to be completely hidden behind the spread collar 6. As a result of this construction, the collar is not bad-looking even if the added decoration is not attached thereto.

Figure 6:
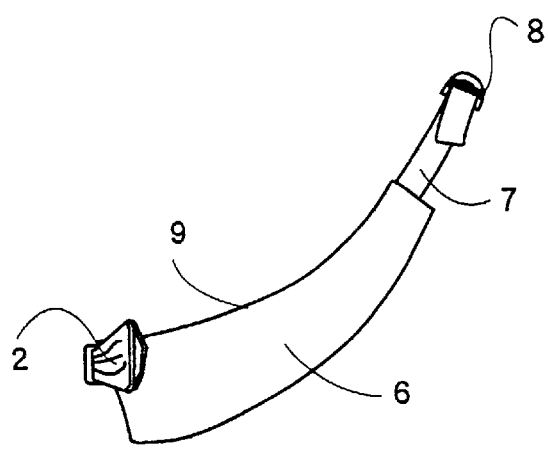
FIG. 6 is a view of the collar for a pet shown in FIG. 1 to which an added decoration different from the added decoration shown in FIG. 1 is attached, the collar being viewed from a side of the pet.
Figure 7:
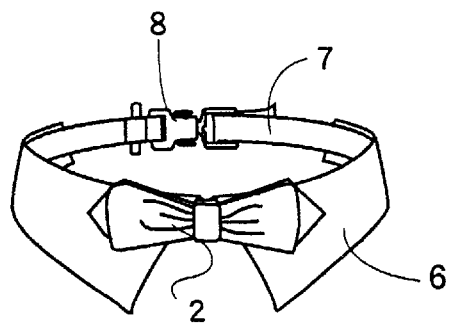
FIG. 7 is a diagram showing the collar for a pet of FIG. 6 as viewed from the front of the pet.

FIGS. 6 and 7 are diagrams showing the collar for a pet to which a bow tie 2 serving as an added decoration is attached to the piece of Velcro 3. Although not shown, there is another piece of Velcro 2 (e.g., a hook tape) on the reverse side of the bow tie 2 so that the bow tie 2 can be attached to the piece of Velcro 3. The bow tie 2 can be attached and detached to the collar by means of a snap-like button, while putting the socket side of the snap-like button in the middle of the length between the buttons 4 shown in FIG. 5 and putting the ball side of the snap-like button on the reverse side of the bow tie 2. Further, the entire collar is made waterproof, and hence the collar for a pet is hard to stain. Still further, the band 7 is lined with satin, and hence the collar for a pet is pet-friendly in the sense that the hair of the pet can be protected from being rubbed against the collar. As shown in FIG. 6, the spread collar 6 and the band 7 have an upper edge 9 extending like an arcuate ascending curve to the front from the rear to which the buckle 8 is attached.

Figure 8:
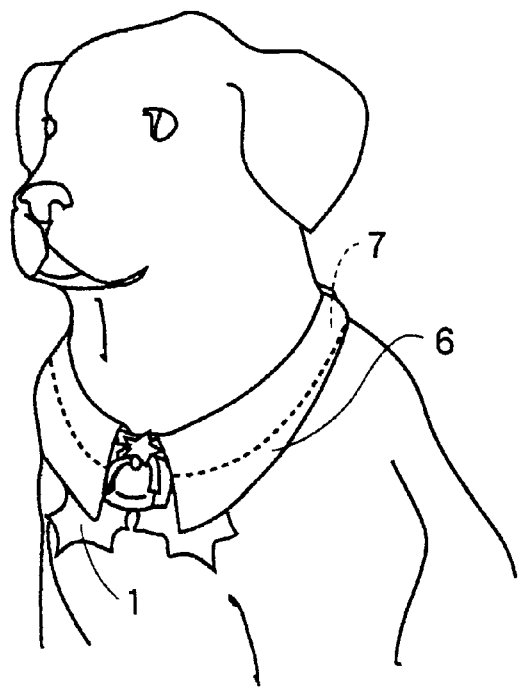
FIG. 8 is a diagram showing the collar for a pet of FIGS. 1 to 7, which is adjusted for a dog with a Christmas decoration attached thereto, and which is put on a dog.
Figure 9:
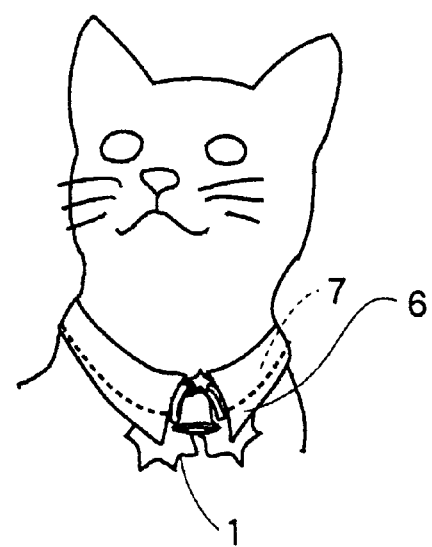
FIG. 9 is a diagram showing the collar for a pet of FIGS. 1 to 7, which is adjusted for a cat with the Christmas decoration attached thereto, and which is put on a cat.

FIGS. 8 and 9 are diagrams showing a dog and a cat wearing collars for pets, respectively. Each of the collars for pets is provided with such a personifying decoration so to allow the band 7 and the spread collar 6 to fit around the neck of the pet.

Figure 10:
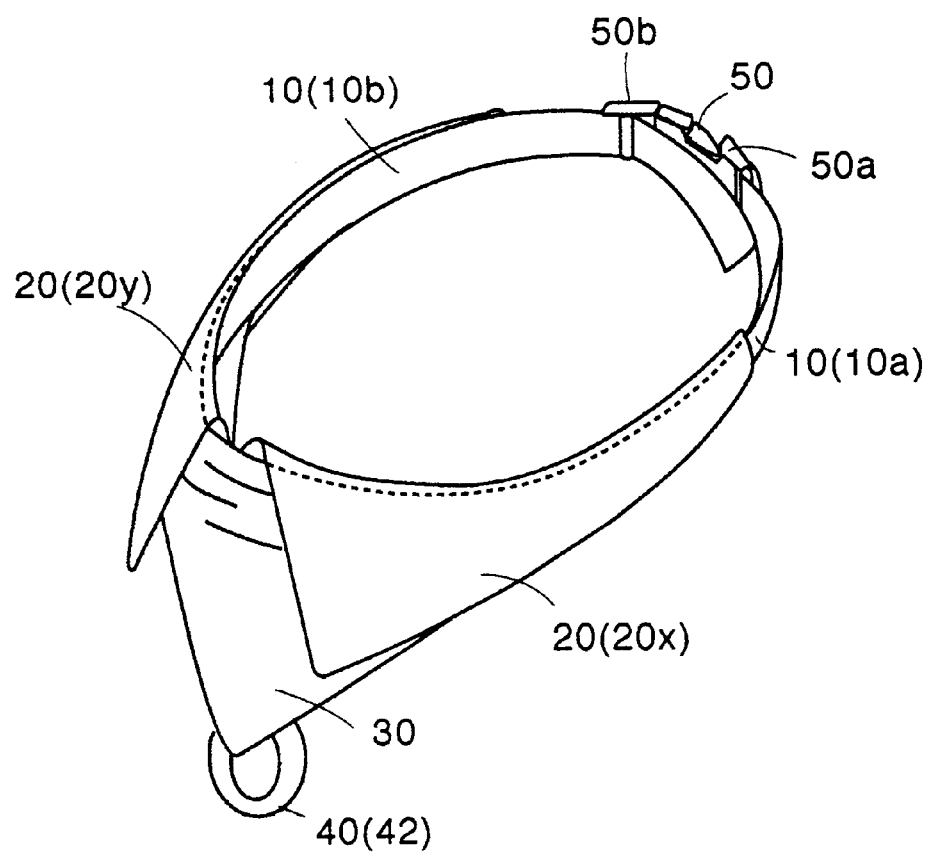
FIG. 10 is a perspective view showing a collar for a pet according to a second embodiment of the present invention.

As shown in FIG. 10, a collar for a pet according to a second embodiment comprises a band 10 serving as the body of the collar, a spread collar 20 that is an exemplary personifying decoration means, a bandanna 30 that is an exemplary added decoration, a pendant 40 that is also an exemplary added decoration, and a buckle 50 for fastening both ends of the band 10.

The band 10 is formed in such a manner that the end of a right-half band part 10a as viewed from the front of a pet is sewed to the end of a left-half band part 10b so as to partially overlap each other. In this embodiment, the band 10 can be looped through the buckle 50. It is to be noted that the expression "right" or "left" will hereinafter indicate the direction in which one views a collar for a pet from the front when the collar is put on a pet.

The spread collar 20 has a right-half spread collar portion 20x and a left-half spread collar portion 20y, which are independent of each other. The right-half spread collar portion 20x and the left-half spread collar portion 20y are sewed to the right-half band part 10a and the left-half band part 10b, respectively, so as not to be easily separated from the collar. The spread collar portions 20x and 20y are sewed up, as shown by the shaded part in FIGS. 12 and 13, at the entire part of an upper-end edge curved portion 20a of the spread collar 20 and at points 10c and 10c in the lower rear end of the spread collar 20. They are sewed up at these portions in order to improve fitness between the neck of the pet and the band 10, and in order to improve easiness in attaching an added decoration, which will be described later.

On the other hand, the bandanna 30 and the pendant 40 are detachably attached to the band 10, because the bandanna 30 and the pendant 40 need to be changed to another type of added decoration to taste. How the bandanna 30 and the pendant 40 are attached to the band will be described later. It is to be noted that the spread collar 20 maybe fixed to the band 10 by other means, such as adhesion, without being sewed onto the band 10. Further, snaps, buttons or fasteners may also be used so that the spread collar 20 can be attached to and detached from the band 10 easily.

The buckle 50 includes a movable buckle inserting portion 50b provided on the loose end of the left-half band part 10b and a buckle receiving portion 50a fixed to the loose end of the right-half band part 10a. Therefore, the band 10 can form a loop by uniting the buckle inserting portion 50b with the buckle receiving portion 50a. In this embodiment, the loose end of the band part 10b is directly extended, without being folded, towards the band part 10a so as to overlap with the portion 10a. As a result, the reverse side of the band part 10b does not come outside, and hence the appearance of the band 10 is aesthetically satisfactory with only the front surfaces of the band portions 10a and 10b exposed. It is to be noted that the loose end of the band part 10b will always stay in place because it is fastened between the neck of the pet and the buckle 50.

In this embodiment, the buckle 50 is arranged at such a position that the collar may be detachably attached on the rear side of the neck of the pet, because the collar needs to be readily attached and detached and needs not to give the pet a sense of asymmetry. Further, the buckle 50 may also be arranged at such a position as to be detachably attached to the front of the neck of the pet. It is to be noted that the buckle 50 may be arranged at a position either on the right or left of the neck of the pet, without being attached to the rear or the front, as long as the collar can be attached readily and the pet does not feel a sense of asymmetry.

Figure 11:
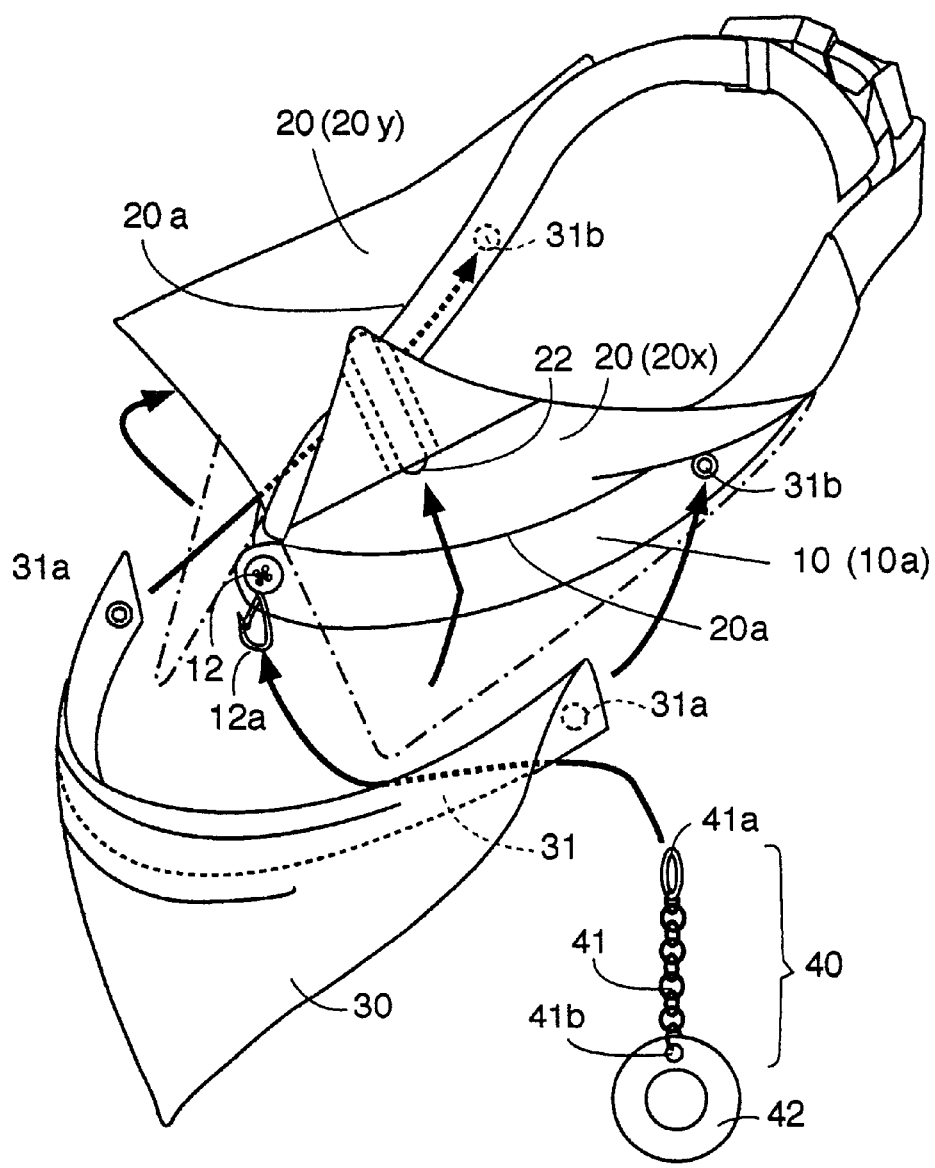
FIG. 11 is a diagram for illustrating how a bandanna and a pendant are attached to a band of the collar for a pet of FIG. 10.

FIG. 11 is a diagram for illustrating how the bandanna 30 and the pendant 40 are attached to the band 10 of the collar for a pet. On the base of the substantially triangular bandanna 30 is provided a band-shaped portion 31. The ball sides 31a and 31a of two snaps are fixed to both ends of the band-shaped portion 31, respectively. On the other hand, the socket sides 31b and 31b of the snaps are fixed to predetermined positions of the band 10 which are behind the spread collar 20, respectively, so that the socket sides 31b and 31b are not seen from outside. The socket sides 31b and 31b are not seen when the spread collar 20 is hung down, whereas they are seen from outside when the spread collar 20 is folded up from the position indicated by the one-dot broken line shown in FIG. 11. The bandanna 30 can be fixed to the band 10 by fastening the ball sides 31a and 31a with the socket sides 31b and 31b.

Further, the pendant 40 is attached to the band 10 as follows. A link 41a on an end of a chain 41 of the pendant 40 is attached to a fitting 12a attached to an aesthetic button 12 in the front of the band 10 in such a manner that the surface of the button 12 is coplanar with the hook portion of the fitting 12a. In this embodiment, the button 12 and the chain 41 are arranged behind of the bandanna 30 so as to further overlap with the overlapped portion between the right-half band part 10a and the left-half band part 10b. The button 12 is attached to the band 10 in such a manner that the band 10 looks like a shirt even when the bandanna 30 or the pendant 40 is removed. As a result of this construction, only the main body 42 of the pendant 40 is seen from outside as far as the pendant 40 is concerned when the bandanna 30 and the pendant 40 are attached to the band 10 as shown in FIG. 10. It is to be noted that the link 41a is put into the fitting 12a so as to be orthogonal to the fitting 12a. Further, a link 41b on the side of the main body 42 is attached to the pendant 40 so as to be orthogonal to the surface of the main body 42 of the pendant 40, and thus the pendant 40 always shows its front.

Since the pendant 40 is detachably attached, the collar without the pendant 40 is easily washed. That is, the band 10 and the spread collar 20 are made of an easily washable material. Specifically, they are made of thick cotton or wool. Further, the spread collar 20 is resin-coated so that it will not be easily soiled. It is to be noted that the band 10 and the spread collar 20 may be made of knit goods, synthetic fibers such as acrylic fibers and nylons, or artificial leathers. Further, since the bandanna 30 is also detachably attached, it is easy to wash the bandanna 30 separately.

Figure 12:
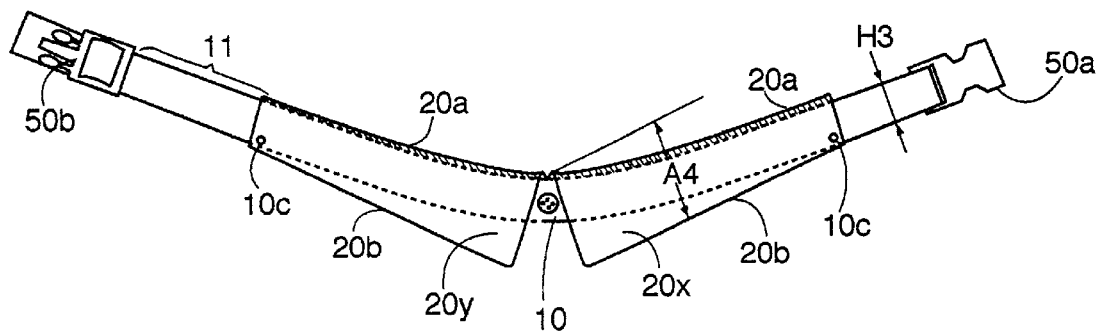
FIG. 12 is a diagram showing a developed state of the collar for a pet of FIG. 10.

FIG. 12 is a diagram showing a collar for a pet according to an embodiment of the present invention in a developed form. The band 10, which is greatly different from an ordinary collar, has a downwardly curved shape in FIG. 12. The collar is shaped as described above so that when worn by a pet, the collar should not look unnatural as a decoration for the pet which has no shoulder and chest like a person. It is to be noted that when an added decoration such as the pendant 40 is attached to the collar for a pet, the collar is likely to hang down low due to the weight of the decoration. To overcome such a shortcoming, the band 10 is curved, and the length of the collar is adjusted by means of the buckle 50 in the rear, so that the spread collar 20 can be drawn near the chin of the pet in accordance with the kind of dog. As a result, the collar allows the pet to look as if a person were wearing a piece of clothing, without forming a superfluous clearance between the neck and the collar.

Further, when the band 10 is curved, the band 10 and the spread collar 20 can be joined together easily. To prevent the front of the spread collar 20 from being lowered down, the spread collar 20 may also be attached bent to a noncurved band. However, this entails a lot of labor in attaching the spread collar 20 to the uncurved band, and hence this is an obstacle in reducing the cost of manufacture of the collar. In addition, such a collar is suitable only for slenderly necked pets, such as ferrets or cats. Thus, it is preferable to attach the spread collar 20 along the band 10.

Figure 13:
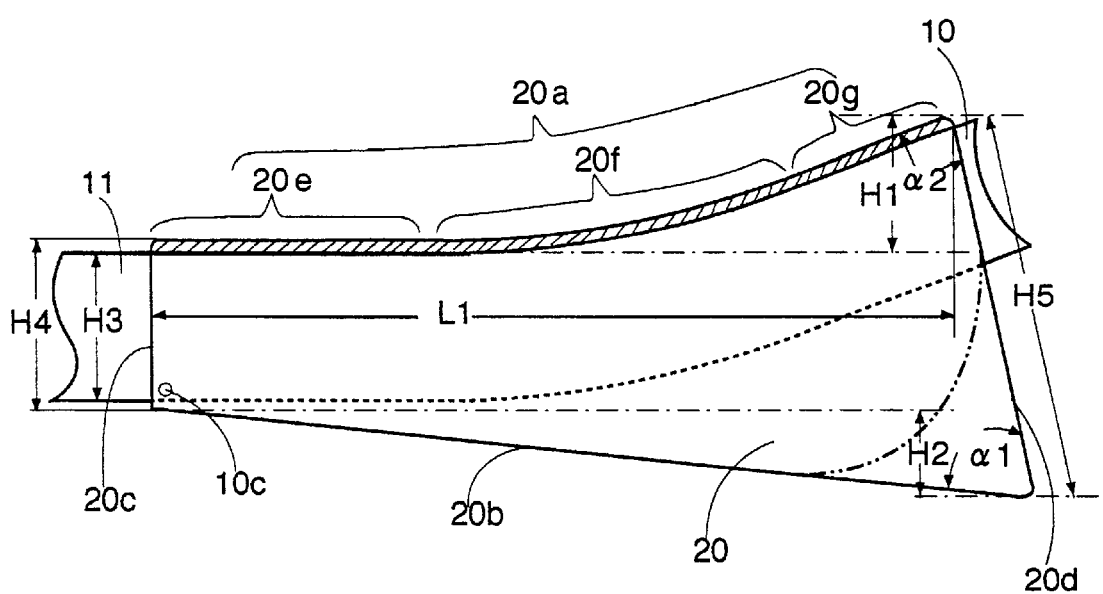
FIG. 13 is a diagram showing the main portion of the left half of FIG. 12 in an enlarged form.

Further, as shown in FIGS. 12 and 13, the spread collar 20 includes the upper-end edge curved portion 20a having the same shape as the curve of the upper-edge of the band 10, a lower-end edge straight portion 20b, a rear joint 20c for joining the upper-end edge curved portion 20a and the lower-end edge straight portion 20b, and a front joint 20d. By making the curve of the upper edge of the band 10 the same as the upper-end edge curved portion 20a in shape, the spread collar 20 substantially overlaps with the band 10, and hence the collar becomes well fitted around the neck of the pet.

The upper-end edge curved portion 20a includes a rear straight portion 20e, a curved portion 20f whose radius of curvature becomes gradually decreased towards the front, and a front straight portion 20g. As a result of this construction, there is a dimensional difference H1 in height, by which the front end of the spread collar 20 is about 20 to 40 mm higher than the case where a straight portion 11 in the rear of the band 10 is directly extended (see the one-dot broken lines in FIG. 13). There is also a dimensional difference H2 in height, by which the front end is about 10 to 25 mm lower.

It is to be noted that the lower front-end angle α1 formed by the lower-end edge straight portion 20b and the front joint 20d is set to values ranging from 65 to 80 degrees. Further, the upper front-end angle α2 formed by the front straight portion 20g and the front joint 20d is set to values ranging from 70 to 85 degrees. Still further, the rear joint 20c is set to the width H4 that is slightly larger than the width H3 of the straight portion 11 of the band 10. The front joint 20d is set to the width H5, which is 1.5 to 3.5 times the width H4. In this embodiment, the width H4 is set to 30 mm, the width H5 is set to 76 mm, and the width H5 is about 2.5 times the width H3. In addition, in this embodiment, the width H4 and the dimensional difference H1 are set to substantially the same value, which is 30 mm, and the dimensional difference H2 is set to 15 mm which is almost half the width H4 and the dimensional difference H1.

As described above, in this embodiment the ratio of the dimensional difference H1, the width H4 and the dimensional difference H2 is set to 1:1:0.5. However, taking the width H4 as a reference, the dimensional difference H1 is preferably set to 0.5 to 1.5 times, and the dimensional difference H2 is preferably set to 0.2 to 0.8 times. Further, in this embodiment, the ratio of the dimensional difference H1 to the length L1 of the spread collar 20 shown in FIG. 13 (the length L1=the distance from the rear joint 20c to the intersecting point between a horizontal line extending directly from the straight portion of the band 10 and the perpendicular to the uppermost end point of the front joint 20d) is set to 5:1. However, setting the length L1 to 1, the dimensional difference H1 is preferably set to 0.15 to 0.25 in order to increase aesthetic and comfortability for the pet. It is to be noted that the lower front end of the spread collar 20 may be shaped as shown by the two-dot broken line in FIG. 13. The thus shaped spread collar 20 can make the pet look more cute, and hence is more suitable for a female pet.

Figure 14:
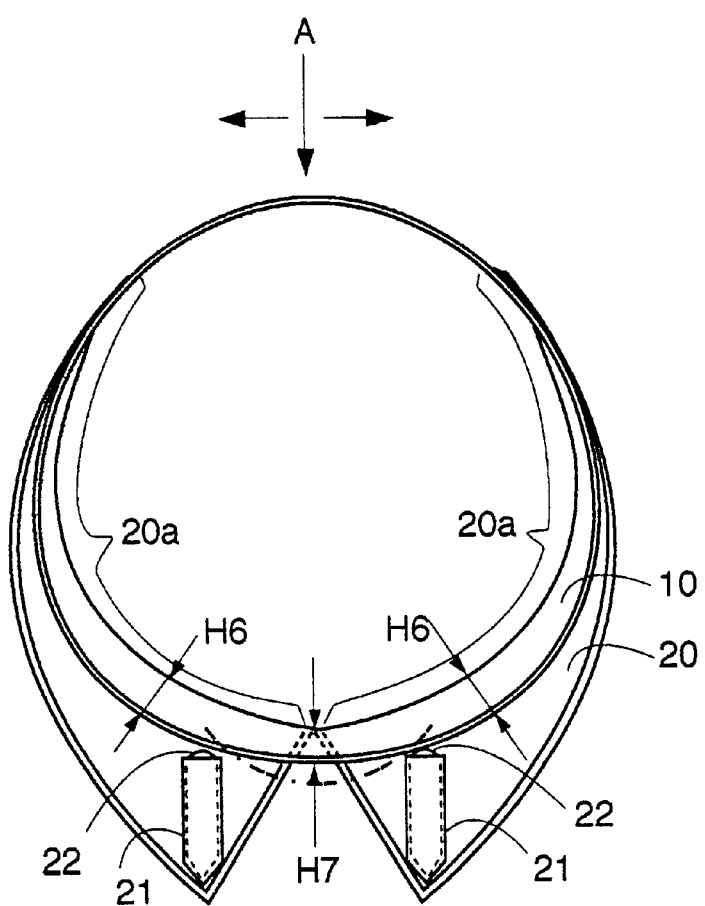
FIG. 14 is a diagram showing the collar for a pet of FIG. 10 as viewed from a lower side (from the chest of the pet when the collar is put on the pet) with a buckle omitted therefrom.

When thus constructed collar for a pet is viewed from the chest of the pet, a portion including the upper-end edge curved portion 20a forms a circle with respect to the center of the collar as shown in FIG. 14 in which the buckle 50 is omitted. The width of the collar seems to gradually grow from the rear to the front of the band 10. The collar has, in the front, a maximum width H6 at both ends of an arc subtended by an angle of about 30 degrees. Further, the center front of the collar has a width H7 that is slightly narrower than the maximum width H6. As a result, the collar is wide on the chest side and narrow on the head side, and hence is suitable for the neck of a dog or a cat. It is to be noted that the width H7 may also be made the same as or slightly larger than the maximum width H6.

The reason why the width H7 is slightly narrower than the maximum width H6 is because the center front portion of the collar is pulled down as indicated by the one-dot broken line when the pendant 40 weighing a certain amount is attached to the collar. That is, the collar is designed so that it will be fitted around the neck of a pet (particularly, a dog) as a whole even if it is pulled down.

Figure 15:
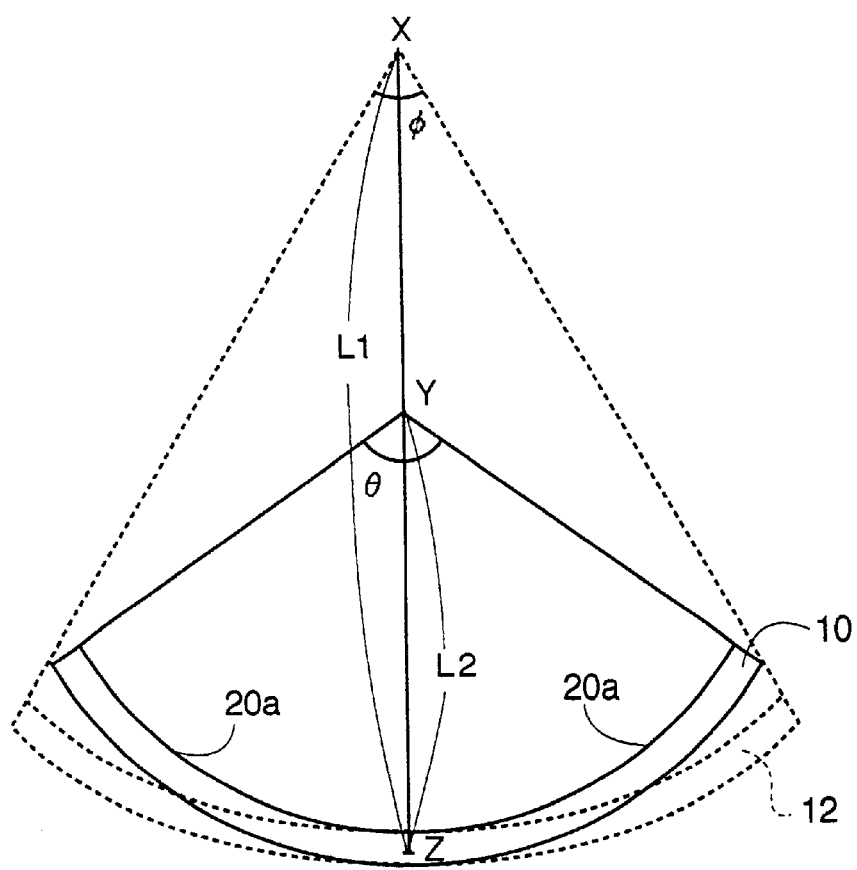
FIG. 15 is a diagram showing a state in which the band of the collar for a pet of FIG. 10 is developed on both sides as indicated by the arrows A of FIG. 14, the diagram comparing the state with the curved shape of the neck of a piece of clothing for a person.

Next, a collar for a pet having a different curved shape from the curved shape of the band 10 shown in FIGS. 12 and 13 will be described with reference to FIG. 15. FIG. 15 is a diagram showing the band 10 cut away at the portion indicated by the arrow A in FIG. 14 and developed towards both sides with the portion touching the neck of a pet facing downward. The neck 12 (shown in a developed form by the dotted line in FIG. 15) of a piece of clothing worn by a person is almost straight, although slightly curved. In contrast thereto, the band 10 (shown by the solid line in FIG. 15) of the collar for a pet is more curved than the neck 12 because of the upper-end edge curved portion 20a.

Specifically, the radius of curvature L2 of the band 10 of the collar for a pet (the distance from the center Y of a circle corresponding to the curvature of the band 10 to the center Z of the band 10) is made smaller than the radius of curvature L1 of the neck 12 (the distance from the center X of a circle corresponding to the curvature of the neck 12 to the center Z of the neck 12). In other words, the angle θ subtending the band 10 of the collar for a pet (hereinafter referred to as "central angle θ") is larger than the angle φ subtending the neck 12 (hereinafter referred to as "central angle φ"). The central angle θ varies depending on the kind of pet, but needs to be larger than the central angle φ for the neck 12 of the piece of clothing to be worn by a person who walks upright. The central angle θ suitably varies from 45 to 145, and more preferably from 60 to 130, taking into consideration fitness around the neck of a pet and aesthetic.

Figure 16:
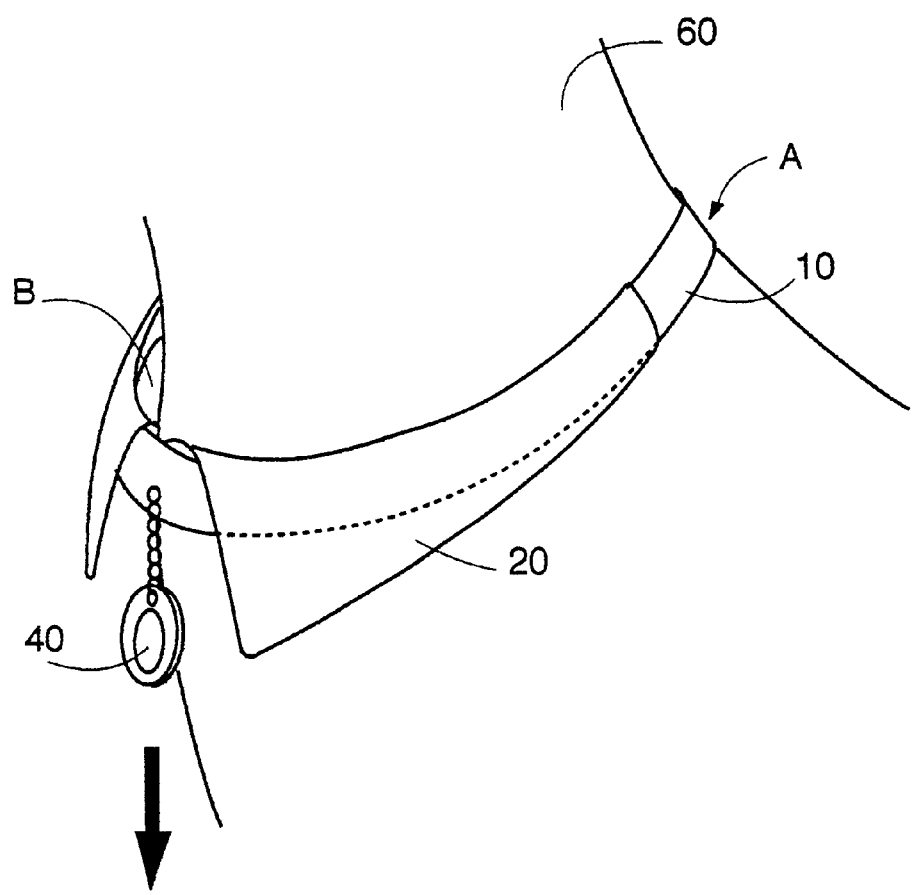
FIG. 16 is a diagram showing the collar for a pet of FIG. 10 which is put around the neck of a pet, emphasizing a clearance between the front of the collar and the neck.

FIG. 16 shows the band 10 that touches the rear portion A of the neck of a pet 60 and that has a clearance B provided with respect to the neck of the pet 60 in the front. Although the collar is not worn so loosely as this actually, FIG. 16 shows the looseness in emphasis. When the band 10 is worn so loosely as shown in FIG. 16, the collar tends to turn, making it likely to turn the spread collar 20 backward. To avoid this, the pendant 40 having some weightiness is attached to the front, so that the front of the collar is pulled downward.

However, the weight of the pendant 40 practically needs to be well adjusted, because if the pendant 40 is heavier, the collar is prevented from turning more effectively, but the weight to be borne by the pet at the neck increases. Through various studies, the weight of the pendant 40 has been found to be optimal when varying from 1/5 to 3 times the weight of the collar. Further, taking into consideration the material for an added decoration and the weight to be borne by the pet in strict terms, the weight of the pendant 40 is preferably set to values ranging from 1/3 to 1.5 times the weight of the collar. When the pendant 40 is heavier than 1/5 the weight of the collar, the collar is more effectively prevented from turning, whereas when the pendant 40 is lighter than 3 times the weight of the collar, the weight borne by the pet is reduced.

Figure 17A:
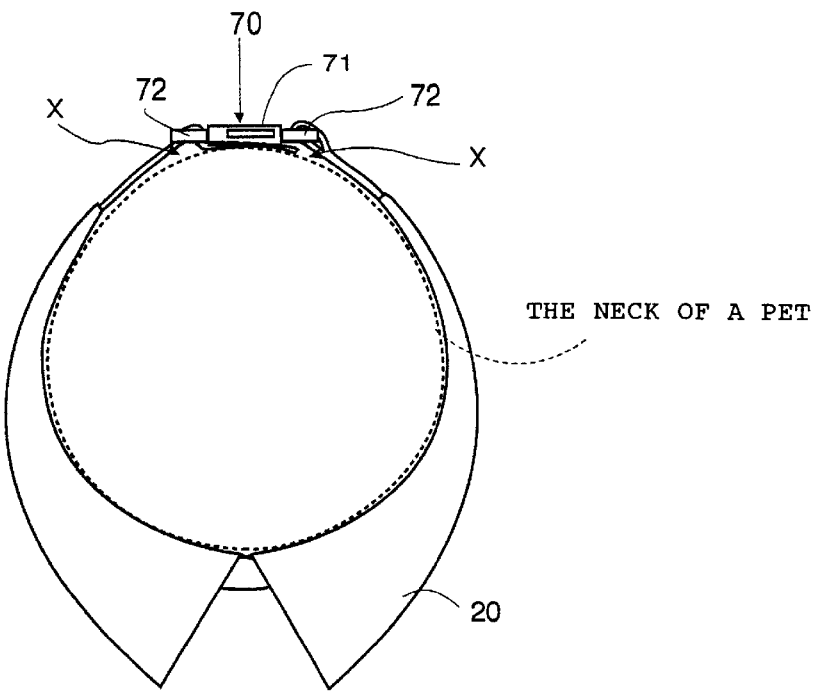
Figure 17B:
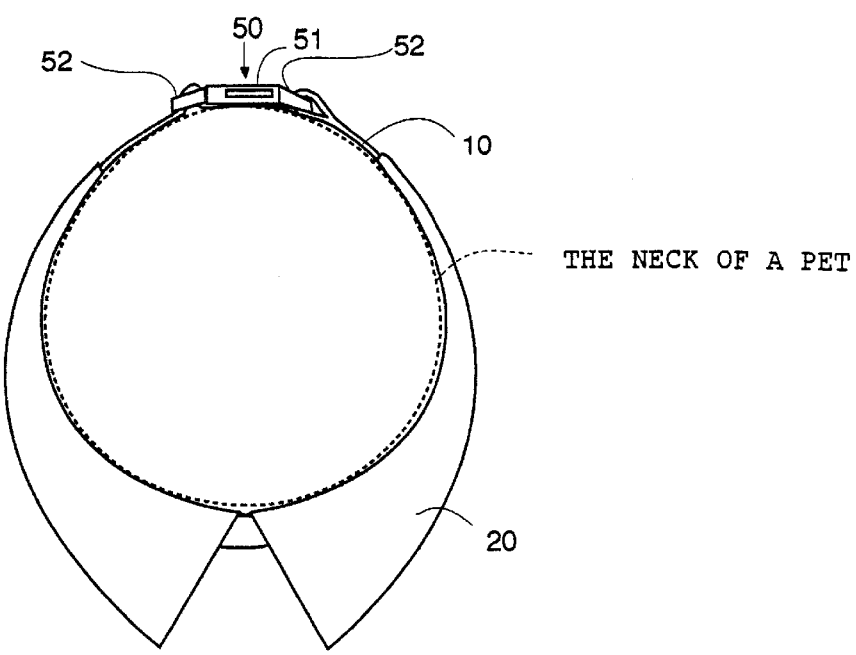

Further, there is another technique for preventing the collar from turning. FIG. 17(A) shows the shape of a buckle 70 to be attached to the band 10 of a collar previously created by the inventors (hereinafter referred to as "previously created collar") and FIG. 17(B) shows the shape of a buckle 50 to be attached to the band 10 of a collar for a pet of this embodiment. Both figures are present for a comparison.

Band fixing portions 72 and 72 on both sides of a joint 71 in the buckle 70 of the previously created collar are substantially aligned with the joint 71 as viewed from top. With this shape, the neck of a pet and the buckle 70 are brought into point contact, rather than surface contact, with each other when the collar is put around the neck of the pet, and hence a clearance X is provided between the band 10 and the neck of the pet. Thus, the collar is susceptible to turn. Further, the buckle 70 touches only part of the neck of the pet, thereby causing the pet to bear a heavy weight at the touched part. Therefore, the pet tends to feel uncomfortable with the collar.

In the case of the collar of this embodiment which is shown in FIG. 17(B), band fixing portions 52 and 52 on both sides of the buckle 50 are so bent from both sides of a joint 51 as to extend along the curved surface of the neck of the pet. Therefore, when the collar is put around the neck of the pet, the buckle 50 comes in surface contact with the neck of the pet. As a result, a superfluous clearance is hard to exist between the neck of the pet and the band 10, and hence the collar is hard to turn. Further, the entire surface of the buckle 50 comes in contact with the neck of the pet, and hence the problem that the weight is applied only locally is eliminated, thereby making the pet forget that the pet is wearing the collar.

Figure 18:
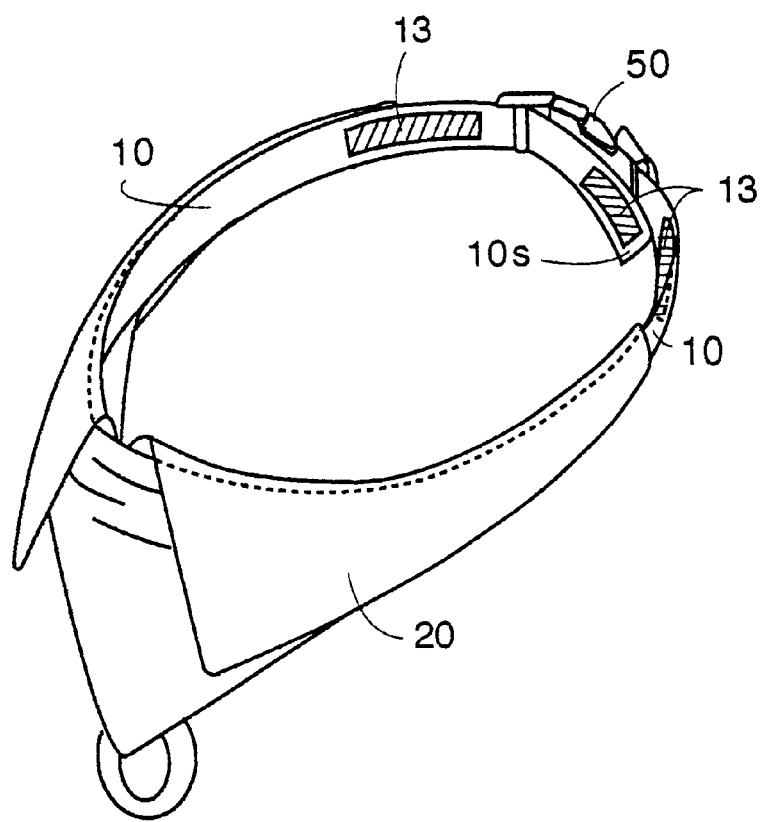
FIG. 18 is a view showing stoppers being arranged on the inner surface of the band of the collar for a pet of FIG. 10.

Further, as shown in FIG. 18, stoppers 13 having a large coefficient of friction may be provided as another type of turn preventing means. The stoppers 13 may be arranged at a portion on the inner side of the band 10, i.e., at a portion with which the neck of the pet comes in contact. Each stopper 13 is made of a group of tiny projections and is backed with an adhesive sheet. The use of these stoppers 13 singly or in combination with the pendant 40 or the buckle 50 will enhance the effect of preventing the collar from turning. Further, since a band end 10s of the band 10 that passes through the buckle 50 is on the side that touches the neck of the pet, the outermost overlap of the band 10 hides the band end 10s and the reverse side of the band 10 never comes outside, and hence an aesthetically satisfactory collar can be provided.

Figure 19:
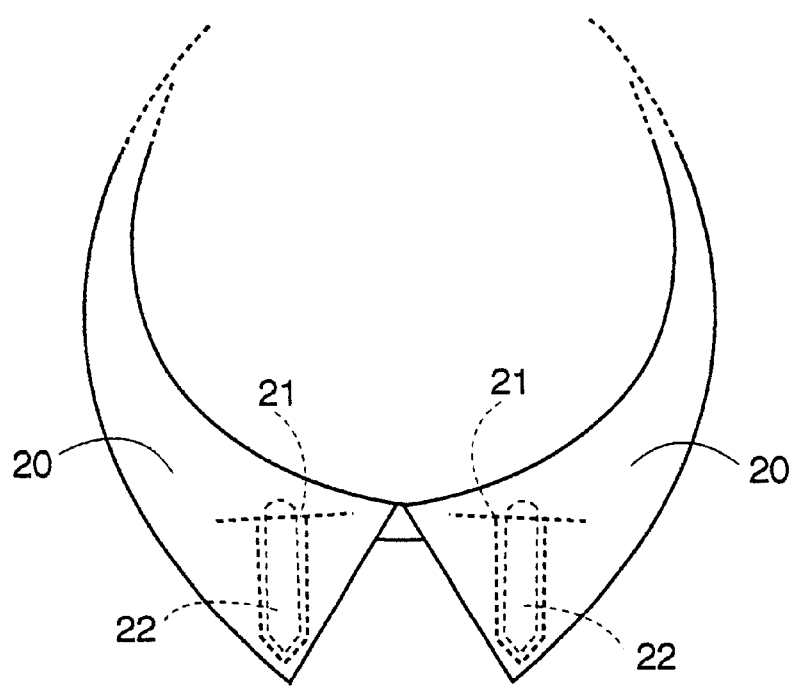
FIG. 19 is a view showing a spread collar attached to the collar for a pet of FIG. 10 in transparency.

FIG. 19 is a diagram showing the spread collar 20 of a collar for a pet in transparency. As shown in FIGS. 11 and 14, oblique pockets 21 are provided in the front of the spread collar 20. Sword-like deformation preventing plates 22 reaching the lowermost ends of the spread collar 20 are inserted into the pockets 21, respectively. Each deformation preventing plate 22 is made of a resin such as acrylic. As a result of this construction, even if the pet wears a collar having the spread collar 20, the collar is hard to deform. The material for the deformation preventing plate 22 is not limited to acrylic, but may be any material that is harder than the material for the spread collar 20. Further, for washing, it is suggested that the deformation preventing plates 22 be taken out of the pockets 21.

Figure 20:
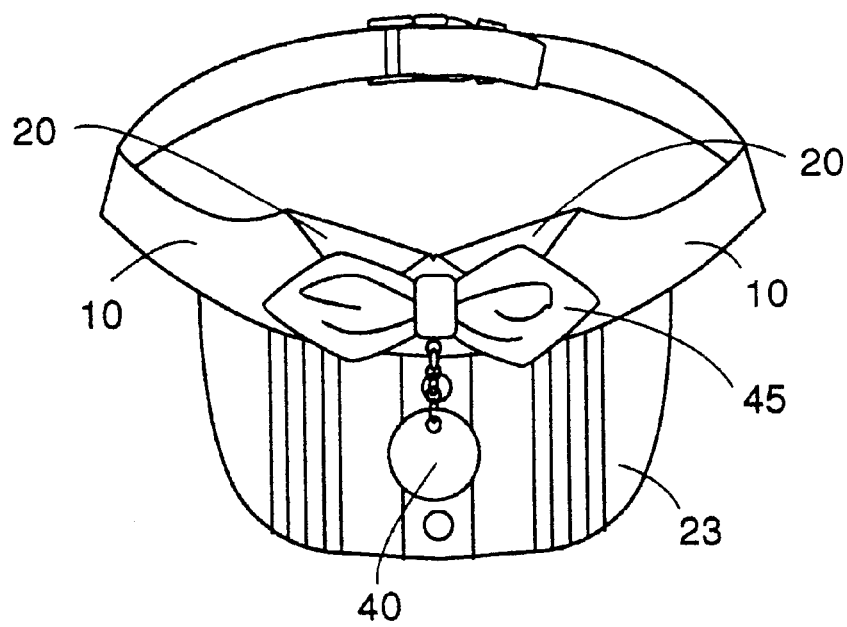
FIG. 20 is a diagram showing a collar for a pet according to a third embodiment of the present invention, and is a perspective view of the collar for a pet having a bib extending from the neck of a pet.

FIG. 20 is a perspective view of a collar for a pet having a bib 23 extending from the neck of a pet. The collar for a pet shown in FIG. 20 includes the spread collar 20 attached to the band 10, and further has the bow tie 45, the pendant 40 and the bib 23 which are detachably attached thereto as added decorations. Such a collar for a pet increases the level of personifying decoration compared with the collars for pets shown in FIGS. 1 to 18 because the bib 23 downwardly extending long is attached thereto.

Figure 21A:
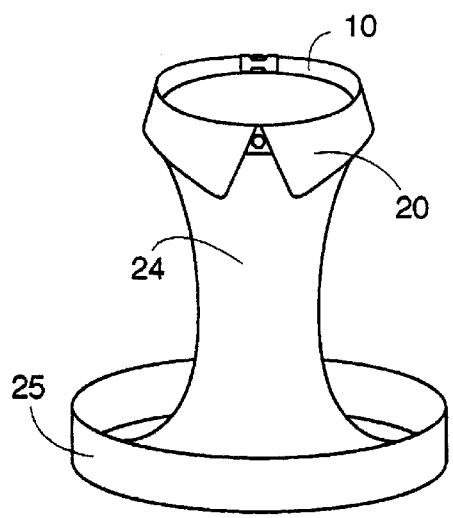
Figure 21B:
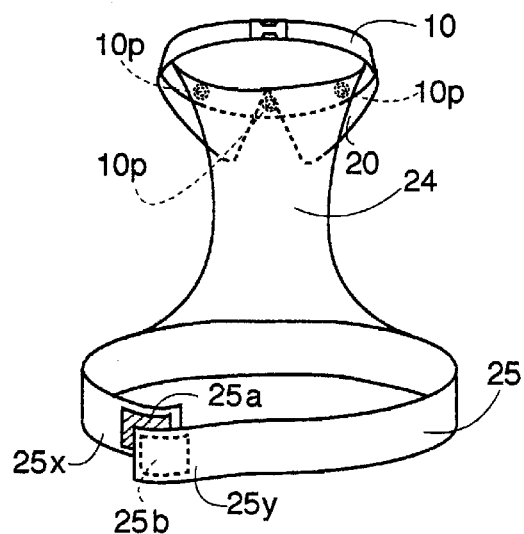
Figure 21C:
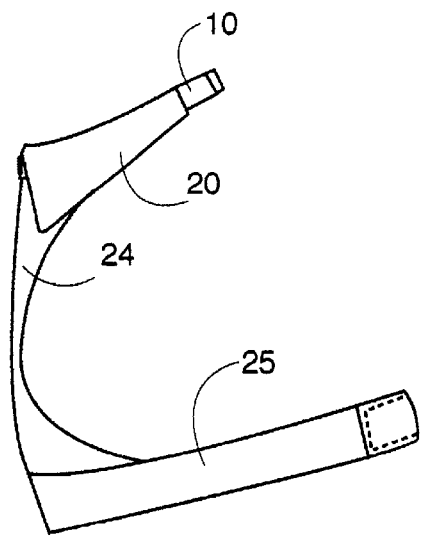
Figure 22A:
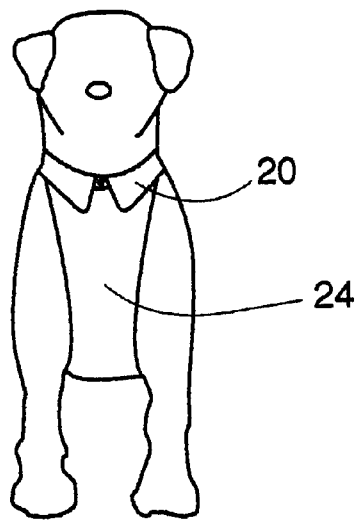
Figure 22B:
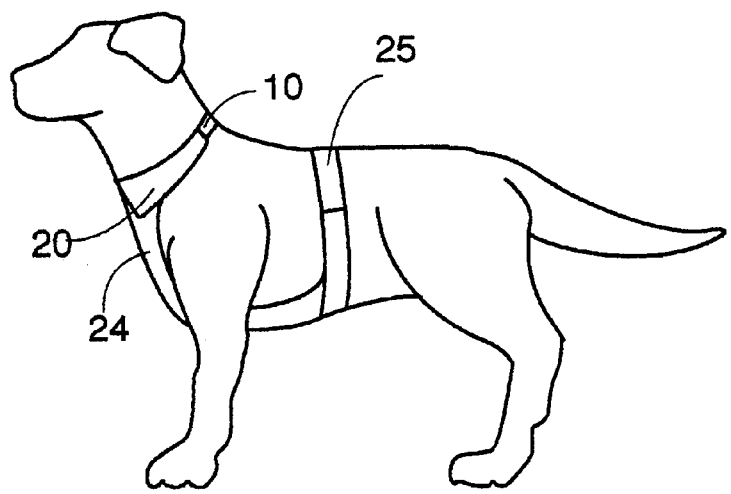
Figure 22C:
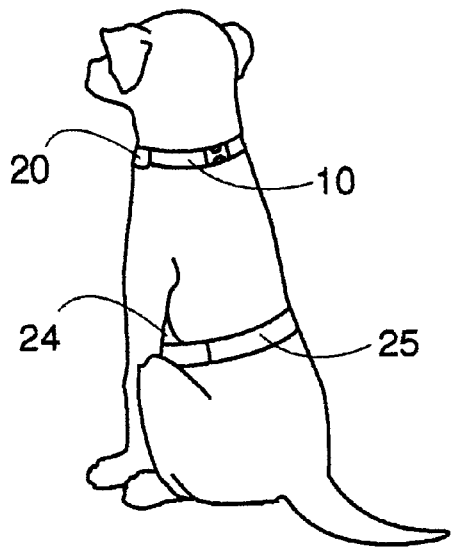

FIGS. 21(A) to 21(C) are diagrams showing a collar for a pet with a bib that is more personified than the collar for a pet shown in FIG. 20. FIGS. 22(A) to 22(C) are diagrams showing a pet 60 wearing the collar for a pet with a bib shown in FIGS. 21 (A) to 21(C). This collar includes the band 10, the spread collar 20, a bib 24 extending downwardly far from the band 10, and a bib rear-end fixing band 25 provided at the rear end of the bib 24.

The bib 24 is long enough to cover the chest and the belly of the pet 60 extending from its neck. The bib rear-end fixing band 25 is designed to be detachably wound around the belly of the pet 60 so that the bib 24 should not hang downward. The rear end fixing band 25 may be attached and detached by arbitrary means, such as snaps, buttons, or Velcro. In this embodiment, as shown in FIG. 21(B), e.g., a loop tape 25a and a hook tape 25b of Velcro are pressed together, so that one end portion 25x of the bib rear-end fixing band 25 and the other 25y are fastened together. Further, the band 10 and the bib 24 can be separated by undoing snaps 10p.

The collar for a pet with a bib shown in FIGS. 21 and 22(A) to 22(C) cover the belly of the pet which is easily soiled, and hence can keep the pet clean.

Further, as shown in FIGS. 22(A) to 22(C), both the band 10 and the bib rear-end fixing band 25 are seen when viewed from the side or the rear of the dog, but only the spread collar 20 and the bib 24 are seen when viewed from the front of the dog. Thus, when compared with the collars without the bib 24, the collar of this embodiment are superior in terms of personifying decoration.

Figure 23:
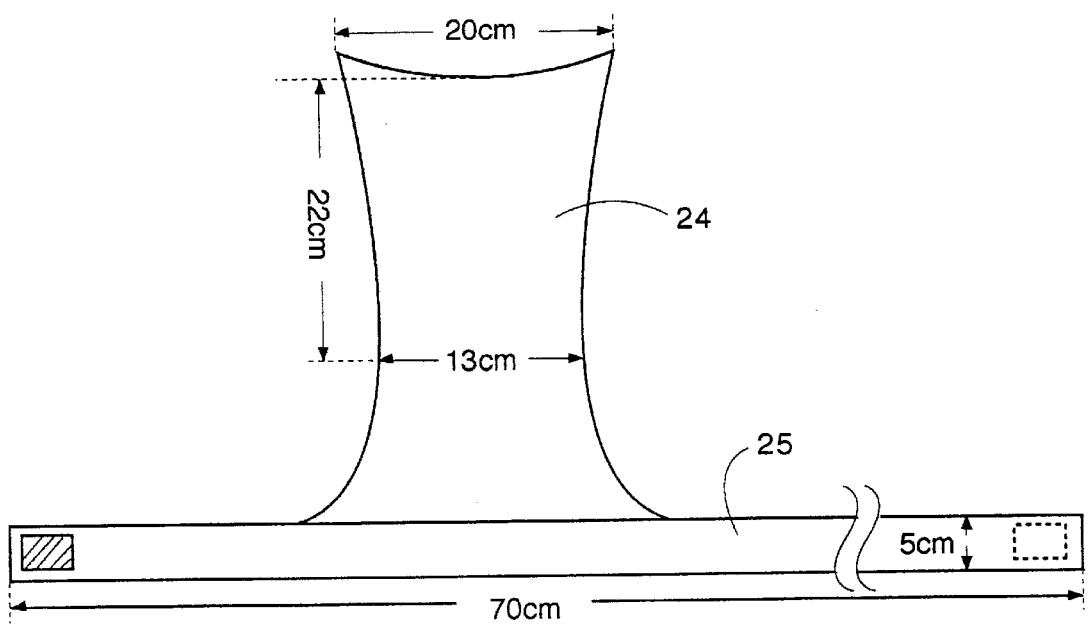
FIG. 23 is a diagram showing the collar for a pet of FIG. 21 in a developed form.

FIG. 23 is a diagram showing the bib 24 and the bib rear-end fixing band 25. The upper portion of the bib 24 is curved so as to extend along the curve of the band 10. Further, while the width of the upper portion of the bib 24 is set to 20 cm, the narrowest width in the vicinity of the center of the bib is set to 13 cm. As a result of such a shape, the bib 24 fits the dog's chest and belly, thereby making the collar with the bib an excellent personifying decoration. Still further, the length of the bib rear-end fixing band 25 is 70 cm so that a large dog can wear the collar. On the other hand, the width of the band 25 is set to 5 cm, which is wide enough to meet both requirements of strength and appearance.

Figure 24:
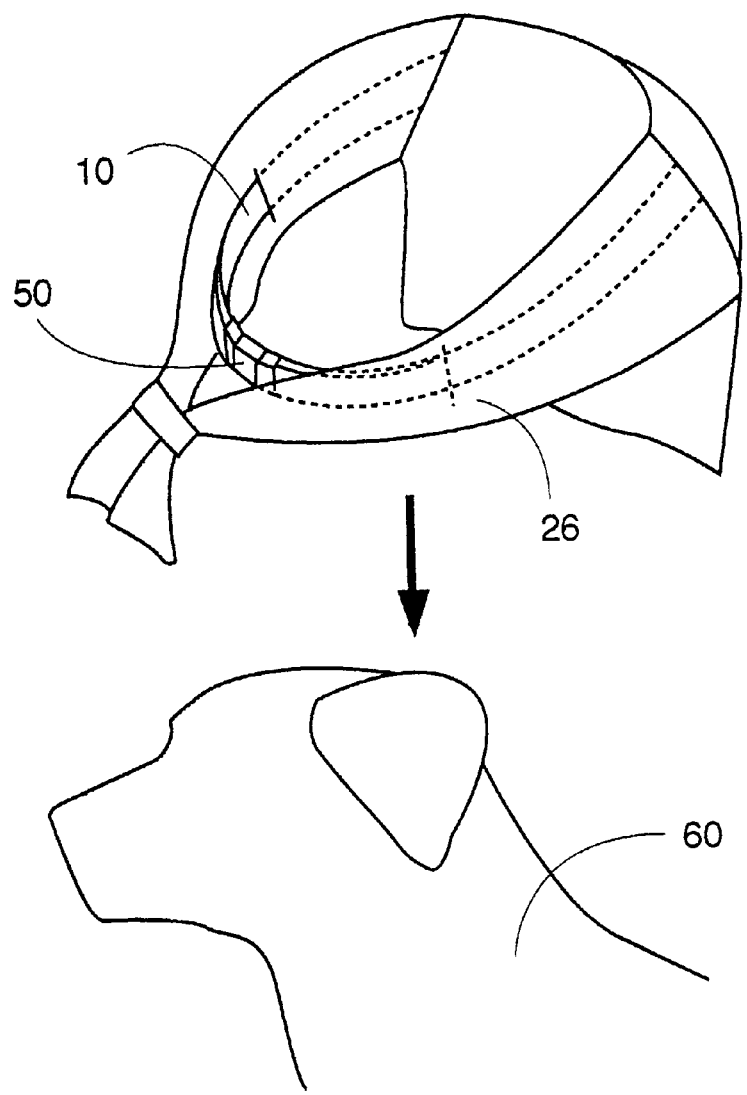
FIG. 24 is a diagram showing a collar for a pet according to a fifth embodiment of the present invention and is, more specifically, a perspective view of the collar for a pet with a sweater over the collar.

FIG. 24 is a diagram showing a collar for a pet according to another embodiment. The collar for a pet shown in FIG. 24 has a sweater attached thereto, with the sleeves 26 of the sweater tied in the front and its body attached to the rear. The buckle 50 comes in the front of the pet 60. While the curved buckle 50 described above is used, the curve of the buckle has few effect on preventing the collar from turning, because there is a clearance in the front of the neck of the pet. Thus, the buckle 50 is made heavy in order to prevent the collar from turning. Specifically, as mentioned above, the weight of the buckle 50 is set to 1/5 to 3 times or, more preferably, to 1/3 to 1.5 times the weight of the collar.

It is to be noted that the band 10 may be a loop, or may also be a loop with its rear portion cut apart as shown in FIG. 24. With the latter shape of the band 10, the collar weighs more heavily in the front, and hence the collar is prevented from turning more effectively. The band 10 may not be curved but may be formed into the same shape as that of the conventional collar. Further, the band 10 is so long as to reach the armholes of the sweater, and hence the band 10 can be sewed to the sleeves while threading through the sleeve. Such a sewing technique contributes to increasing the strength of the collar for a pet.

The collar for a pet shown in FIG. 24 has a soft portion in the rear of the neck, and hence the pet feels cozy wearing the collar. In addition, the body of the sweater keeps the pet off not only the cold, but also rain. Moreover, the knot formed by tying the sleeves 26 and the distal ends of the sleeves 26 function as a weight. As a result, the collar is prevented from turning more effectively.

Figure 25:
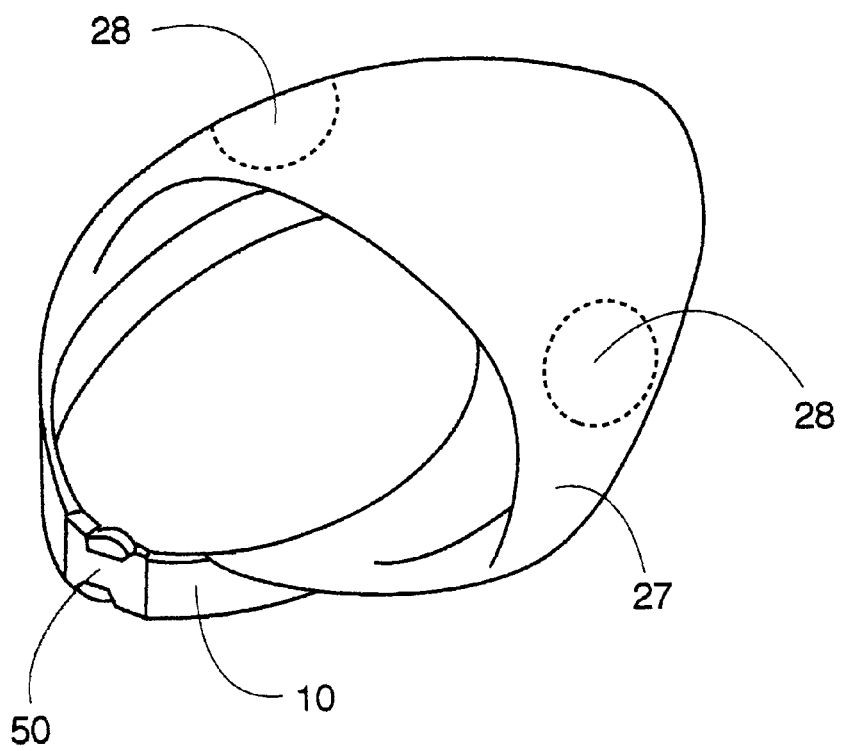
FIG. 25 is a diagram showing a collar for a pet according to a sixth embodiment of the present invention and is, more specifically, a perspective view of the collar for a pet with a hood.
Figure 26A:
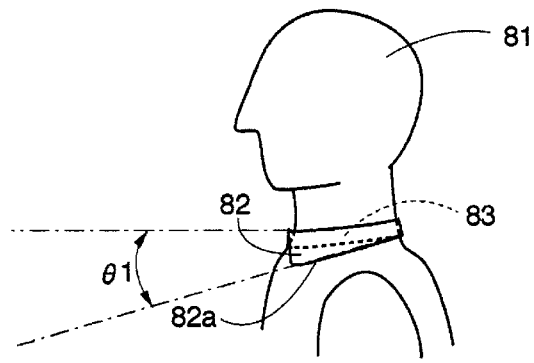
Figure 26B:
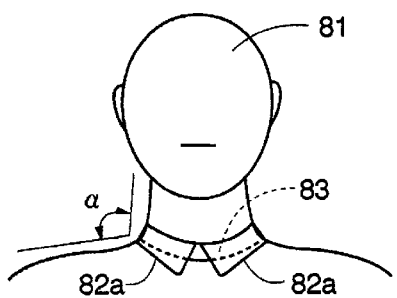
Figure 26C:
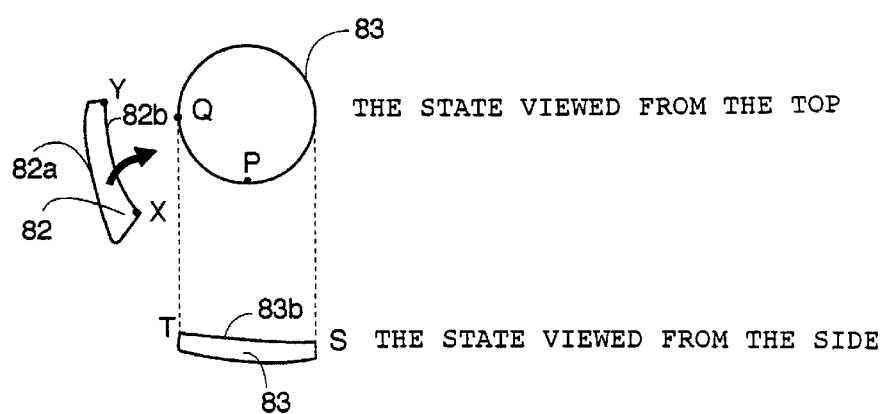
Figure 27A:
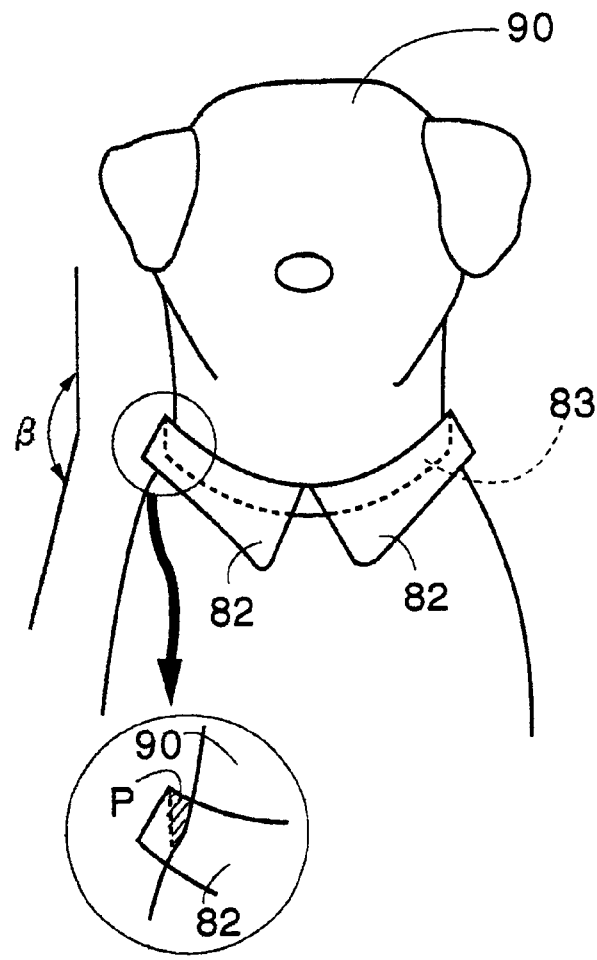
Figure 27B:
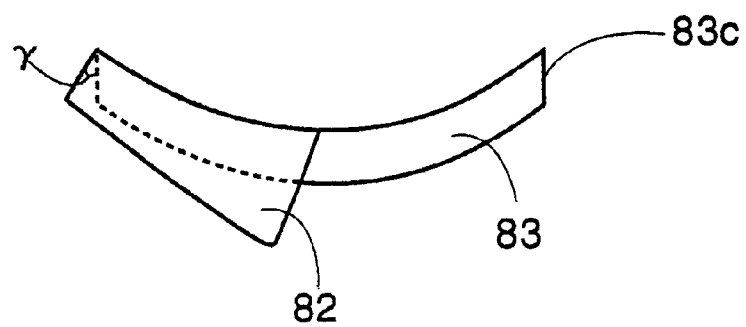
Figure 28:
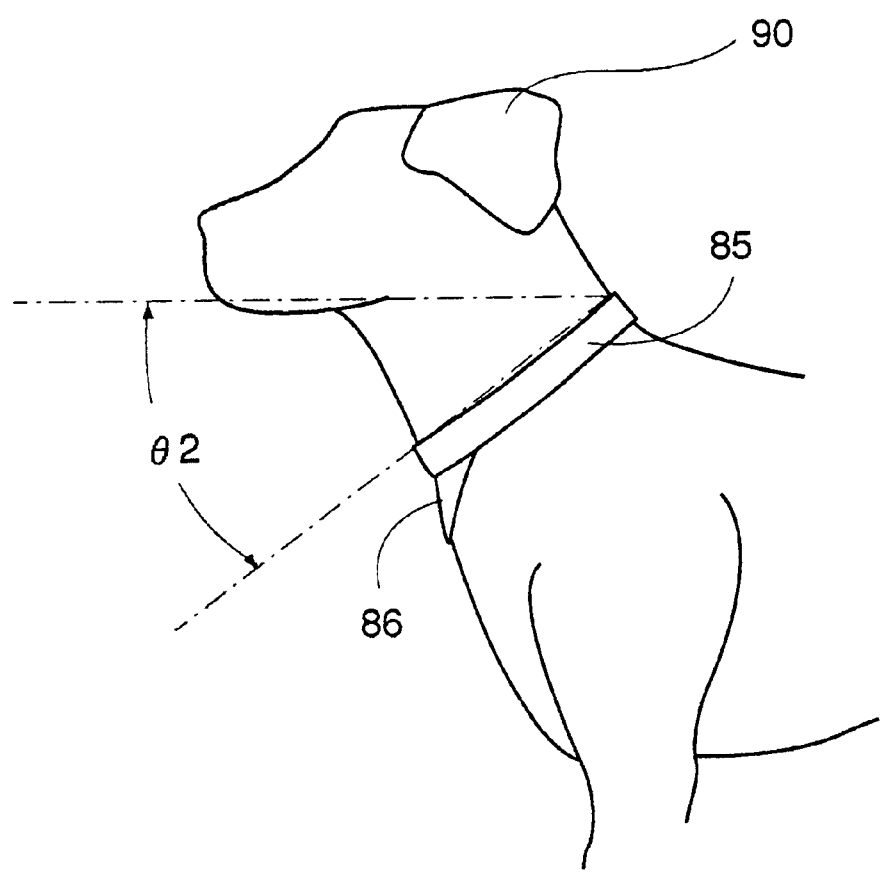
FIG. 28 is a diagram showing a dog wearing a conventional collar, as viewed from the side.

FIG. 25 is a diagram showing a collar for a pet with a hood. In a manner similar to the collar shown in FIG. 24, this collar has the buckle 50 in the front. Therefore, the collar is prevented from turning by setting the weight of the buckle 50 to 1/5 to 3 times or, more preferably, to 1/3 to 1.5 times the weight of the collar. Further, since the hood extends so far as to cover the ears of the pet, it is preferable to make holes 28 at positions corresponding to the ears as indicated by the one-dot broken lines.

In the aforementioned embodiments, the bands 7 and 10 and the personifying decoration means are curved, and the personifying decoration means such as the spread collars 6 and 20 are fixed along the upper edges of the bands 7 and 10. However, the present invention is not limited to these embodiments. For example, the curved spread collars 6 and 20 may be attached to an elastic straight band. As a result of this construction, the band becomes curved along the shape of the spread collars 6 and 20. Conversely, the spread collars 6 and 20 having elastic portions may be attached to the bands 7 and 10 through such elastic portions so as to fit along the curved shape of the bands 7 and 10.

Further, while the case where the central angle θ determined when the band 10 is developed varies from 45 to 145 degrees has been described, the central angle θ may be set, for a small pet such as a newborn puppy, to a value which is approximate to that of the spread collar for a person, or more specifically, to values ranging from 30 to less than 45 degrees. Further, for a large pet such as a lion, its chest grows large from its neck, and hence the central angle may vary from 145 to 160 degrees. Still further, while the band 10 is made of two pieces which are joined together into a single piece, the band 10 may be of a one-piece construction.

Further, the ends of the bands 7 and 10 may be fastened together by means other than the buckles 8 and 50, such as Velcro, snaps or buttons. Further, the personifying decoration means may be a sailor collar and a stand collar other than the spread collars 6 and 20, the bibs 23 and 24 having the spread collars 6 and 20, and a sweater having the sleeves 26, and the hood. Further, the collars for pets of the present invention may be worn not only by a dog but also by such animals as a cat, a ferret, a raccoon, a duck, a fox and a pig.

Further, the collars for pets of the present invention may also be applied to a doll shaped like a dog or a cat.

Further, while the exemplary turn preventing means includes the added decorations, an example of which is the pendant 40, and the buckle 50 and the stoppers 13, it is not limited thereto and other turn preventing means can also be employed. For example, the collar may be prevented from turning by making the front portion of the personifying decoration means heavy. Further, an identification tag may be attached to the pendant 40, or an identification tag, instead of the pendant 40, may be attached to the collar. Further, the weight of the pendant 40 or the buckle 50 attached to the front as the turn preventing means is appropriate when varying from 1/5 to 3 times the weight of the collar. However, if other turn preventing means (e.g., the stoppers 13) is effective, the aforementioned weight may be set to values equal to or smaller than 1/5 times the weight of the collar, whereas if no other turn preventing means can be arranged, the aforementioned weight may be set to values equal to or greater than 3 times the weight of the collar.

The collars for pets according to the embodiments of the present invention are designed mainly for decoration. For a walk in which a strong force is applied to a collar for a pet, it is preferable to replace these decorative collars of the present invention with a collar intended for a walk and having larger strength. It is to be noted that if the bands 7 and 10 are made of a material high in strength similarly to an ordinary collar, the collars for pets of the present invention can be used for a walk. However, it is preferable to use them indoors when a pet is not chained, so that they should not be stained. Further, the straight bands 7 and 10 like an ordinary band, instead of the curved bands 7 and 10 according to the embodiments, are also effective to some extent in terms of preventing the collars from turning. Further, although the collars for pets according to the embodiments of the present invention are not so shaped as to fit around the neck of a person, the collars according to the embodiments of the present invention may also be utilized as attaching to the neck of a person for decoration purposes.

One aspect of the present invention can provide a collar for a pet that allows a family to think that their pet is an equal partner or a friend who is more beloved than a family member by personifying the pet while providing the collar with some decoration. Another aspect of the present invention can provide a collar for a pet, beyond that it simply has personifying decoration means, which is worn comfortably by the pet, looks cute to the eyes of people, and makes the pet more personified. Still another aspect of the present invention can provide a collar for a pet that allows personifying decoration means to be held at a regular position. Still another aspect of the present invention can provide a collar for a pet that increases the ties between a family and their pet by changing the atmosphere and appearance of the pet in accordance with various occasions, and that makes the pet look cute enough even when the collar is put on the pet on no special occasions.

What is claimed is:

1. A collar for a pet comprising:

a band to be wound around the neck of a pet;

a personifying decoration attached to said band for personifying the pet wearing said collar by imitating part of a piece of clothing to be worn by a person; and turn preventing means attached to said band for preventing said band from turning, wherein said personifying decoration comprises a member shaped like a spread collar, said spread collar having a curved shape, a portion of said band coinciding with said curved shape.

2. A collar for a pet according to claim 1 wherein said personifying decoration has a bib to be worn so as to extend from the neck to the belly of the pet.

3. A collar for a pet according to claim 1 wherein said band has a central angle between 45 and 145 degrees that is joined with the upper edge of said personifying decoration along the curve of the upper edge of said band, said band being comprised of two portions joined together in the front.

4. A collar for a pet according to claim 3 wherein said personifying decoration has a bib to be worn so as to extend from the neck to the belly of the pet.

5. A collar for a pet according to claim 1 wherein said personifying decoration is constructed so as to have an upper edge extending in the form of an arcuate ascending curve from the rear to the front of the neck of the pet when said collar is put around the neck of the pet.

6. A collar for a pet comprising:
   a band to be wound around the neck of a pet;
   a personifying decoration attached to said band for personifying the pet wearing said collar by imitating part of a piece of clothing to be worn by a person; and
   turn preventing means attached to said band for preventing said band from turning,
   said personifying decoration having a bib to be worn so as to extend from the neck to the belly of the pet.

7. A collar for a pet according to claim 6 wherein said band has a central angle between 45 and 145 degrees that is joined with the upper edge of said personifying decoration along the curve of the upper edge of said band, said band being comprised of two portions joined together in the front.

8. A collar for a pet according to claim 6 wherein said personifying decoration is constructed so as to have an upper edge extending in the form of an arcuate ascending curve from the rear to the front of the neck of the pet when said collar is put around the neck of the pet.

9. A collar for a pet comprising:
   a band to be wound around the neck of a pet;
   a personifying decoration attached to said band for personifying the pet wearing said collar by imitating part of a piece of clothing to be worn by a person; and
   turn preventing means attached to said band for preventing said band from turning,
   wherein said band has a central angle between 45 and 145 degrees that is joined with the upper edge of said personifying decoration along the curve of the upper edge of said band, said band being comprised of two portions joined together in the front.

10. A collar for a pet according to claim 9 wherein said personifying decoration is constructed so as to have an upper edge extending in the form of an arcuate ascending curve from the rear to the front of the neck of the pet when said collar is put around the neck of the pet.

11. A collar for a pet comprising:
    a band to be wound around the neck of a pet;
    a personifying decoration attached to said band for personifying the pet wearing said collar by imitating part of a piece of clothing to be worn by a person; and
    turn preventing means attached to said band for preventing said band from turning,
    wherein said personifying decoration is constructed so as to have an upper edge extending in the form of an arcuate ascending curve from the rear to the front of the neck of the pet when said collar is put around the neck of the pet.

* * * * *